Nov. 19, 1957 M. W. BANG 2,813,935

MULTIPLE POSITION SWITCH

Filed March 15, 1956 4 Sheets-Sheet 1

INVENTOR.
Mogens W. Bang

BY

Webb, Mackey & Burden

HIS ATTORNEYS

Nov. 19, 1957 M. W. BANG 2,813,935

MULTIPLE POSITION SWITCH

Filed March 15, 1956 4 Sheets-Sheet 2

INVENTOR.
Mogens W. Bang

BY Albert Mackey & Burden

HIS ATTORNEYS

Nov. 19, 1957

M. W. BANG 2,813,935

MULTIPLE POSITION SWITCH

Filed March 15, 1956

4 Sheets-Sheet 3

INVENTOR.
Mogens W. Bang

BY
Webb Mackey & Burden
HIS ATTORNEYS

Nov. 19, 1957 M. W. BANG 2,813,935

MULTIPLE POSITION SWITCH

Filed March 15, 1956 4 Sheets-Sheet 4

INVENTOR.
Mogens W. Bang

BY Webb Mackey & Burden
HIS ATTORNEYS

United States Patent Office 2,813,935

Patented Nov. 19, 1957

2,813,935

MULTIPLE POSITION SWITCH

Mogens W. Bang, Youngstown, Ohio, assignor to Liberty Manufacturing Corporation, Youngstown, Ohio, a corporation of Ohio

Application March 15, 1956, Serial No. 571,798

11 Claims. (Cl. 200—1)

This application relates to a multiple position switch, more particularly to a switch whereby a number of different electrical circuits or electronic components may be electrically connected or disconnected with other electrical circuits.

As a specific example, my invention may be embodied in a tuner for a television receiver. However, it has a number of other applications, for example, measuring equipment, multiple frequency range radio transmitters and receivers, oscilloscopes, etc., where a large amount of circuitry and components is required in a relatively small switching area.

Heretofore, in the above applications, multiple position switches generally have been of the so-called "wafer" type or "turret" type. Such switches have provided mechanisms whereby a series of different electrical circuits or components might be alternately connected and disconnected with other circuits, but they have serious disadvantages.

Thus, in many electronic circuits, it is essential that various electrical components which are to be connected into the circuit by the switch, such as capacitors, resistors, inductances, etc., have very short connections with the circuit into which they are to be connected. This means in the case of wafer switches that the components must be mounted very close to or on the switch itself. If this is done, the components which are not connected into the electrical circuit but which are carried by the switch are very close to the components which are actually connected to the circuit, and capacitive or inductive coupling occurs between the active and inactive components. Such coupling can be avoided only by extensive and complicated shielding, which, however, causes losses due to damping and changes in the circuit due to ground capacity.

In turret type switches, the electronic components to be connected into the circuit are mounted on strips which, in turn, are carried at their ends on circular discs and thus form a cylindrical drum with the components inside the drum and contacts for the components on the outer faces of the strips. Such an arrangement can provide greater distance between active and inactive components on adjacent strips than is possible on wafer switches and, therefore, there is relatively little problem of coupling between capacitors and resistors. However, there is still a problem of coupling so far as the inductances are concerned, and shielding is often required, primarily because the axes of the fields of inductances on adjacent strips are almost parallel and in the absence of shielding heavy coupling would result between the inductances connected into the circuit and inductances on adjacent strips which are not connected into the circuit.

In electronic circuitry, it is often necessary to adjust capacitors and inductances after they have been mounted directly on a switch. This is a particularly difficult operation in the case of wafer switches because the components are mounted along the periphery of the discs forming part of the wafer switch and the discs on which the components are mounted are not rotatable. Therefore, some of the components can be reached only from difficult angles. Where many components are mounted on the switch, as is often the case, adjustment can become still more difficult.

In turret type switches, adjustment of capacitors and inductances which are usually mounted inside the drum is managed by providing adjustment connections through the side or end of the drum. The drum is rotatable so that the components in need of adjustment can be rotated into an accessible position. However, it is usually convenient to make adjustments to components while they are connected to the main circuit, which is mounted (in known applications of turret switches) on a chassis immediately adjacent to the outside surface of the drum. Thus, in order to reach the components in need of adjustment while they are in connection with the main circuit, it becomes necessary to place an adjusting tool through the main circuitry. In so doing, the electrical fields of the main circuitry may be disturbed, thus making the adjustment more difficult.

Inasmuch as wafer and turret switches are cylindrical in shape, any increase in the number of switch positions requires a disproportionate increase in over-all dimensions. Any such increase also requires a nearly complete retooling of switch parts because enlargement of the switch must take place at all angles of the circle if the switch is to maintain its cylindrical shape.

The multiple position switch which I have invented solves or largely alleviates these problems. My switch is generally rectangular in shape and, therefore, will occupy less space than a cylindrical-shaped switch for a given amount of components, circuitry, and switch positions. My switch also has a good space factor in that an increase in switch positions does not require a disproportionate increase in over-all dimensions. Nor does an increase in switch positions require a nearly complete retooling of switch parts in order to maintain a rectangular shape.

While a turret switch can provide greater distance between active and inactive components than is possible on wafer switches, my switch provides a still greater distance between such components without requiring as much over-all size as the aforementioned switches require. Moreover, the axes of active components lie in a plane forming a large angle (preferably 90°) with the axes of adjacent inactive components. As a result of these advantages in respect both to distance and angle between active and inactive components, my switch requires less shielding.

My switch provides convenient access to components while they are connected to the main circuit. It is not necessary to place an adjusting tool through the main circuitry, and the electrical fields of that circuitry are thus not disturbed.

In my switch, I employ circuit strips of dielectric material on which the components are mounted and which act as carriers for the components. These strips resemble somewhat the circuit strips used on turret type switches, but in my switch the strips can carry more components and more contacts in a given strip size than is possible on strips used in known turret switches.

Briefly stated, I mount circuit strips or carriers for the components on a movable support and provide a guide for the support so that the strips follow a curved path as they move adjacent to the fixed contacts of the electrical circuit into which the components carried by the strips are to be connected. The strips are mounted on the support so that they lie in planes at right angles to their path of movement and contacts extend outwardly from the edges of the strips. The support is moved to bring the strips, one at a time, adjacent to the fixed contacts and to bring the contacts on the strips into engagement with the fixed contacts. The radius of curvature of the path of movement of the support adjacent to the fixed contacts and the spacing of the individual circuit strips along the support are such that, when the contacts on one circuit strip engage the fixed contacts, adjacent circuit strips lie in planes which form angles of 90° with the plane in which the strip carrying the active components lies. This means that the axes of the inductances carried by the active and the nearest inactive components are at right angles to each other and thereby inductive as well as other coupling is minimized.

In the accompanying drawings, I have illustrated certain presently preferred embodiments of my invention, in which.

Figure 1:
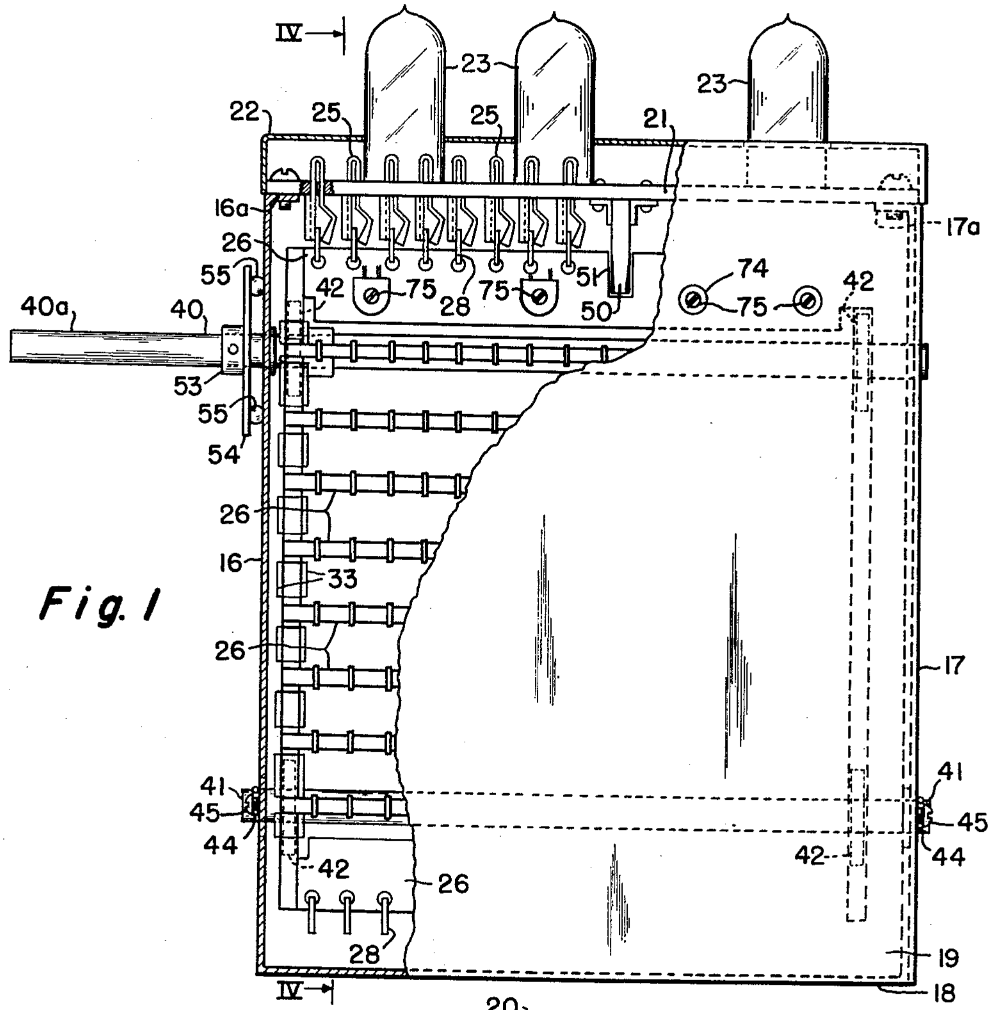
Figure 1 is a side elevation of my switch with a portion of one side broken away to show the interior of the switch.

Referring to Figure 1, my switch comprises a generally rectangular shaped casing, the ends 16 and 17 and the bottom 18 of which are formed from a single strip of sheet metal. The casing has sides 19 and 20 of sheet metal, each rectangular in shape and having flanges **19*a*, 19*b*, 20*a*, and 20*b* which fit over the edges of the ends 16 and 17**.

The ends 16 and 17 have inwardly turned flanges **16*a* and 17*a* which support a mounting base 21 for an electronic circuit and which close the top of the casing. A metal cap 22 fits over the edges and completely covers the mounting base 21 except for openings through which tubes 23** mounted on the base may extend.

Figure 2:
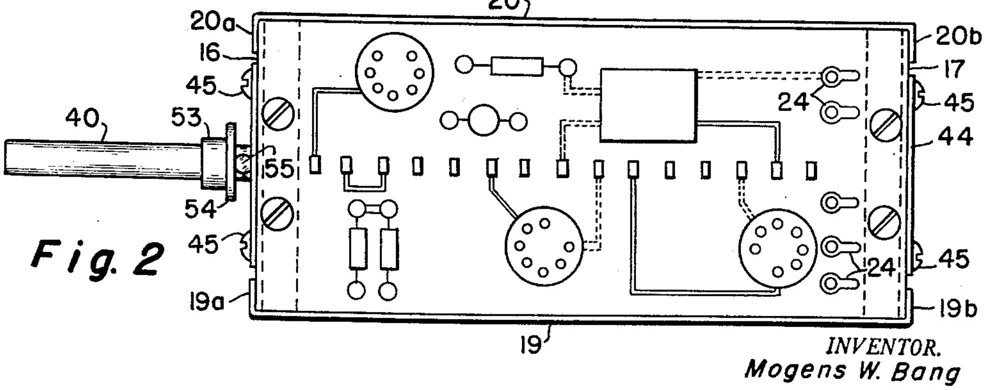
Figure 2 is a plan view of the switch shown in Figure 1, with, however, the cover of the switch and certain electronic components carried near the top of the switch removed.

Referring to Figure 2, it will be seen that the base 21 carries the components of an electronic circuit, including resistors, capacitors, transformers, tubes, and soldering lugs 24, for connecting it into other circuitry.

The primary purpose of my switch is to connect and disconnect alternately a plurality of circuits or electronic components with the circuit carried by the base 21. Accordingly, I provide fixed contacts 25 carried by the base 21 and extending from the base towards the interior of the casing and a plurality of circuit strips 26 which carry the individual components and circuits which are to be connected into the circuit carried by the base 21. A movable support for the strips 26 brings them, one at a time, to a position adjacent the fixed contacts 25 so that contacts carried by the strips may engage the fixed contacts 25. The structure of the strips and of their movable support will now be described.

Figure 8:
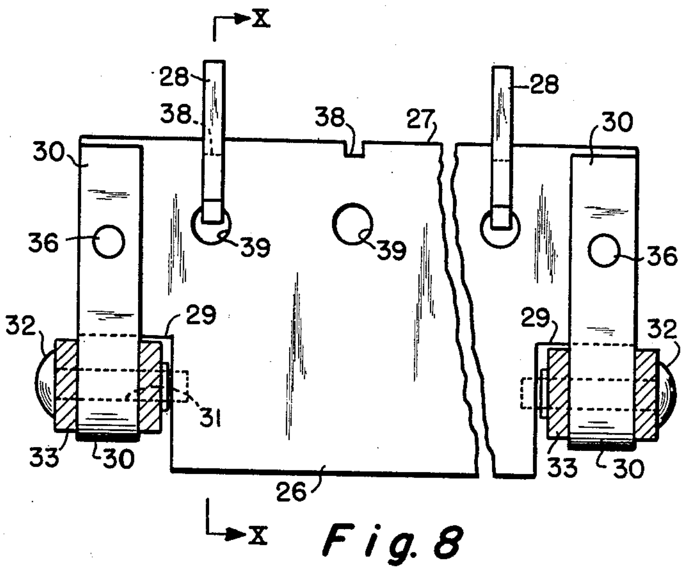
Figure 8 is a side view of a circuit strip used in my switch.

One of the circuit strips 26 which is employed in my switch as a carrier for electronic components and circuits is shown in Figure 8. Each strip comprises an elongated rectangular strip of dielectric material 27. Components and circuits to be connected to the circuit carried by the base 21 are mounted on one or both sides of each strip or in cut-outs in the strip. The components and circuits are not shown in Figure 8 because they vary in accordance with the circuitry in which my switch may be employed. The components are connected to knife-blade contacts 28 mounted on one edge of the strip, as will be hereinafter described. The connections may be by wires or one or both sides of the strip can have printed wiring or printed circuits. Corners on one of the longer sides of the strip are cut out, as shown at 29 in Figure 8, to provide room for and a means of securing the strips to links 30 of two link belts positioned at each end of the strip and providing a movable flexible support for the circuit strips.

Figure 9:
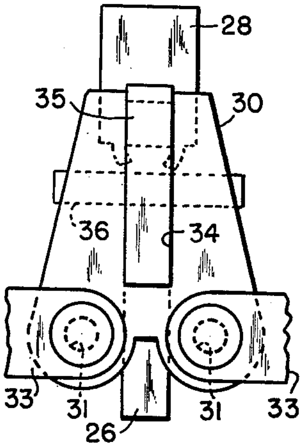
Figure 9 is a partial side view of a belt used in my switch and on which strips such as the ones shown in Figure 8 are mounted.

Referring to Figures 8 and 9, it will be seen that the links 30 are in the form of flat, approximately trapezoidal shaped plates having at their larger end holes 31 through which pins 32 pass to secure the links 30 to narrow flat links 33. The links 30 alternate with the links 33 to form an endless link belt. The links 30 extend away from the pins 32 on one side of the link belt and have elongated slots 34 into which the ends 35 of the strips are closely fitted. The strips are further secured and positioned in the slots 34 by pins 36 which pass through the ends 35 of the strip and portions of the links on both sides of the slots 34. The strips are thus, in effect, links in the endless link belts.

Figure 10:
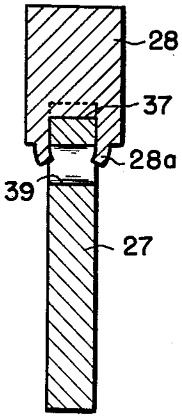
Figure 10 is a section along the lines X—X of Figure 8.
Figure 12:
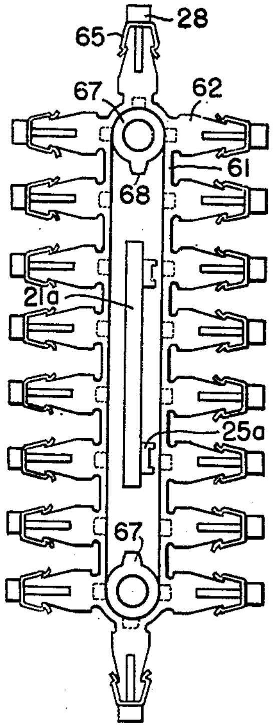
Figure 12 is an end view of another form of belt which may be used in my switch with circuit strips mounted in the belt.

Figures 8 and 10 show how the contacts 28 are secured to an edge of each strip. The contacts 28 are in the shape of small, flat rectangles having notches 37 cut into one end forming tabs **28*a*. These notches fit over the edges of the strips and into notches 38 which are cut into the edges of the strips. The notches 38 serve to accurately position the contacts along the edge of the strip. The contacts 28 are secured in position by slightly bending the tabs 28*a* into the holes 39. Leads from components mounted on the strips may be inserted in the holes and soldered to the contacts, thereby making an electrical connection with the contacts. When an additional number of contacts is required on a strip, they can be placed along the other edge of the strip in the same manner, and a main circuit base 21*a* with fixed contacts 25*a*** provided as shown in Figure 12.

Figure 4:
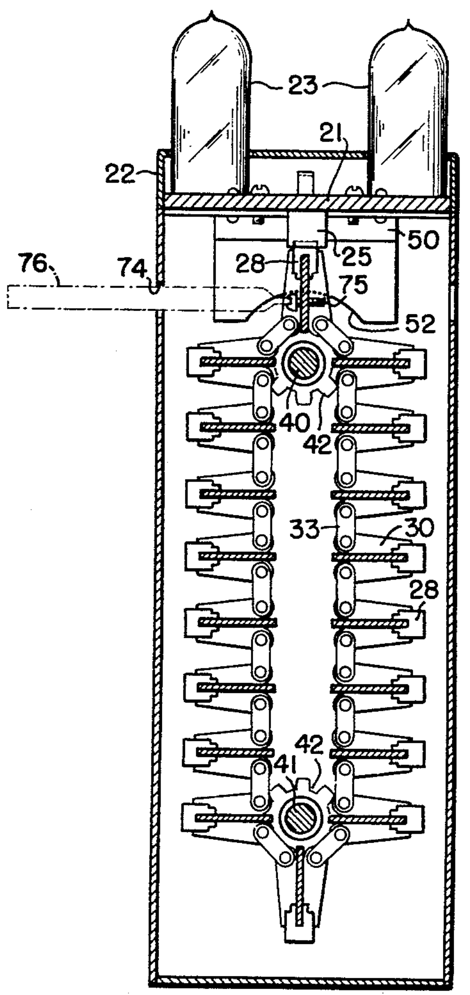
Figure 4 is a section along the lines IV—IV of Figure 1.

Figures 1 and 4 show the manner in which endless belts made up of the links 30 carrying the strips 26 and the connecting links 33 are mounted in my switch. Two shafts 40 and 41 are rotatably mounted in the switch casing, the shaft 40 being positioned adjacent the fixed contacts 25 and the shaft 41 being mounted in the lower portion of the casing. Each shaft has two sprocket wheels 42 spaced apart from each other on the shaft a distance equal to the distance between the two endless belts when they are supporting the strips 26. As most clearly shown in Figure 4, each belt extends around one of the sprocket wheels 42 on the shaft 40 and an opposed sprocket wheel 42 on the shaft 41. The teeth on the sprocket wheels extend into and mesh with pockets formed by the links 33 between the links 30.

Figure 3:
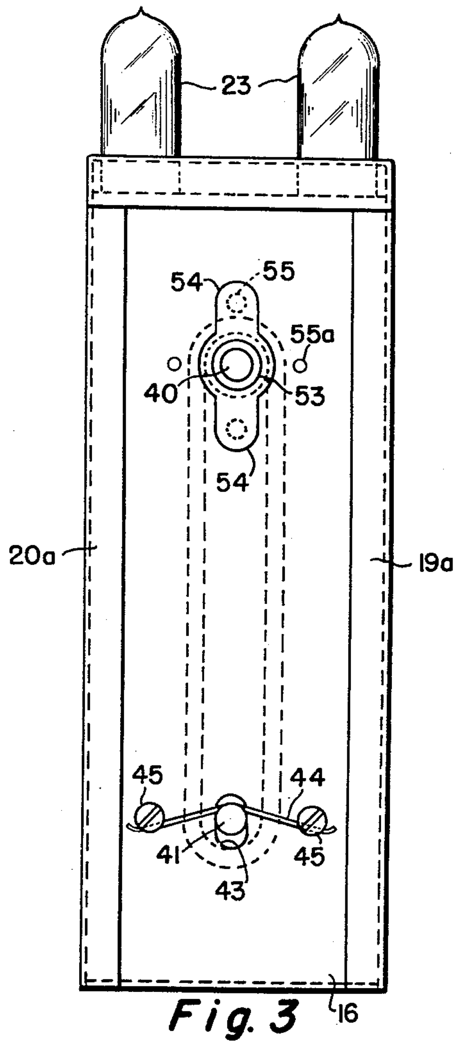
Figure 3 is an end view of the switch shown in Figure 1.

Referring to Figure 3, it will be seen that the shaft 41 is mounted in a slot 43 in the end 16 of the casing. The other end of the shaft 41 is similarly mounted in the end 17. A spring wire 44 supported by two screws 45 rides above each end of the shaft 41 and resiliently urges the shaft 41 away from the shaft 40, thereby keeping the belts tight on the sprocket wheels.

The shaft 40 has an extension 40a extending out from the end 16 of the casing on which a knob or handle can be mounted for turning the shaft 40. Turning the shaft 40 moves the two endless belts which carry the circuit strips 26 and, as this strip moves, the strips are brought, one at a time, adjacent to and beneath the fixed contacts 25. The contacts 28 on the strips extend a sufficient distance from the edges of the strips on which they are mounted that they make electrical connection with the contacts 25, as will now be described.

Figure 7:
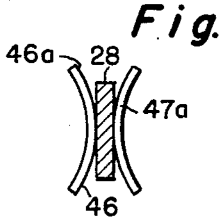
Figure 7 is a section along the lines VII—VII of Figure 6.
Figure 5:
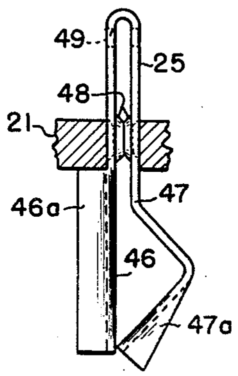
Figure 5 is an end view on an enlarged scale of one of the fixed contacts utilized in my switch.
Figure 6:
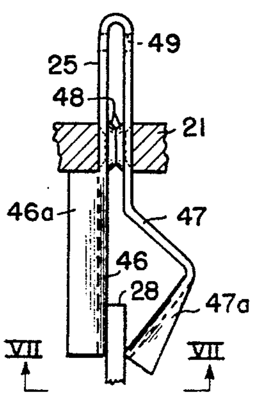
Figure 6 is a view similar to Figure 5 but with a knife-blade contact engaging the contacts shown in Figure 5.

The contacts 25 are shown on an enlarged scale in Figures 5 to 7, inclusive. As there shown, each contact comprises a U-shaped member which extends partially through holes cut in the base 21. One leg 46 is increased in width below the base 21 and is outwardly curved, as shown in Figure 7. The other leg 47 is bent a short distance below the base 21 away from the leg 46 and is then bent at approximately a right angle back towards the leg 46a so that its end engages the end of the leg 46a. The portion 47a between the right angle bend and the end of the leg 47 is gradually increased in width towards its end and curved outwardly as shown in Figure 7 so that the two legs of the contacts form a converging throat into which a contact 28 may pass as the circuit strips are moved adjacent to the fixed contacts. It will also be noted from Figure 6 that there is a line contact between the contact 28 and the outer end of the leg 47a, thus providing a good electrical connection between the contacts 25 and 28. The portions of the legs of the contacts 25 which are within the base 21 carry small opposed bosses 48 which come against each other when the contacts are placed in the openings in the base 21 and prevent the legs of the contacts 25 from being pressed further together at that point, thereby securing the contacts in the base 21. The contacts 25 also have soldering holes 49 adjacent their bases.

I provide a guide for lining up the strips as they move adjacent to the contacts 25 so that the contacts 28 on the strips will be in line with the ends 46a and 47a of the contacts 25. Referring to Figures 1 and 4, this guide comprises a plate 50 which extends towards the interior of the casing from the base 21 into the path of movement of the strips and at right angles to that path. Each strip has a slot 51 extending inwardly from the outer edge of the strip. Referring to Figures 1 and 4, it will be seen that, as each strip approaches the fixed contacts 25, the plate 50 slides into the slot 51 in the strip and thereby positions the strip longitudinally so that the contacts 28 on the strip will pass between the legs of the fixed contacts 25. The edge of the plate 50 away from the base 21 has a semicircular cutout 52 so that the plate 50 will ride in the slots 51 in the strips as they move in a circular path around the sprocket wheel 42 on the shaft 40.

Figures 1 and 3 show a detent mechanism which I provide to position each circuit strip in correct alignment with its contacts 28 centered longitudinally in the legs of the contacts 25. A collar 53 is secured to the shaft 40 and has diametrically extending arms 54. These arms are made of spring metal and carry balls 55 adjacent their outer ends. The end 16 of the casing has two pairs of holes 55a arranged in a circle around the shaft 40 having a radius equal to the distance of the balls 55 from the center of the shaft and spaced 90° from each other. The spring arms 54 press the balls 55 into the holes 55a. The shaft 40 is turned 90° each time a strip is moved to engage the fixed contacts 25 and the collar is angularly positioned on the shaft 40 so that, when the shaft is turned 90° and the balls 55 carried by the arms 54 snap into one of the pairs of opposed holes 55a, a circuit strip 26 is directly beneath the contacts 25 and the contacts 28 of the strips are centered longitudinally in the contacts 25.

Figure 11:
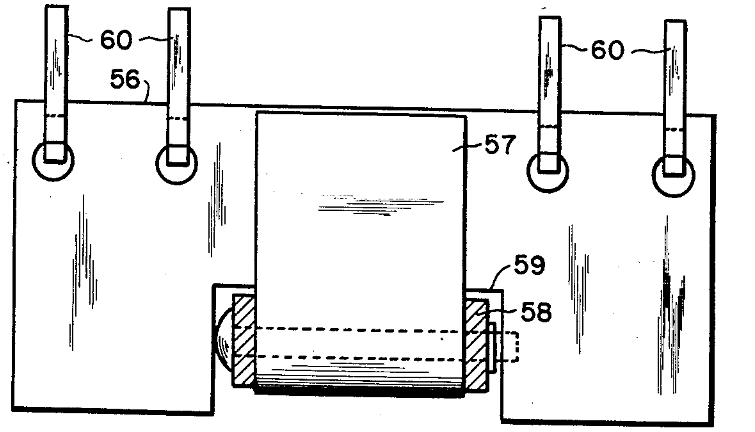
Figure 11 is a side view of a modified form of circuit strip and belt which may be used in the switch shown in Figures 1 to 3, inclusive.

Figure 11 shows a modified form of the movable support for the circuit strips. In this modification, the strips are supported by a single flexible belt which is positioned centrally on circuit strips 56. This single belt has links 57 and 58 which are identical to the links 30 and the links 33, respectively, of the belt shown in Figure 9, except that the links 57 are thicker than the links 30 so that the single belt will have a wider grip on the circuit strips 56 than do each of the two belts used in the switch shown in Figures 1 to 4, inclusive. In this modification, the strips 56 are substantially identical in construction to the strips 26 above described, except that they have a central cutout portion 59 which provides clearance for the single central support, as shown in Figure 11. The strips 56 have contacts 60 along one or both edges which are the same in structure as the contacts 28 on the strips 26 and are secured to the strips 56 in the same manner.

Figure 13:
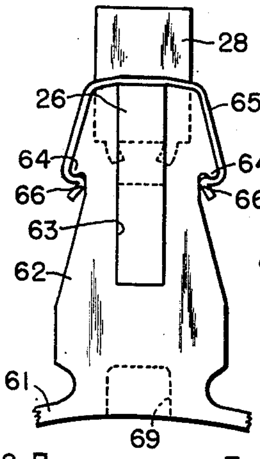
Figure 13 is a partial side view of the belt shown in Figure 12, but on an enlarged scale.
Figure 14:
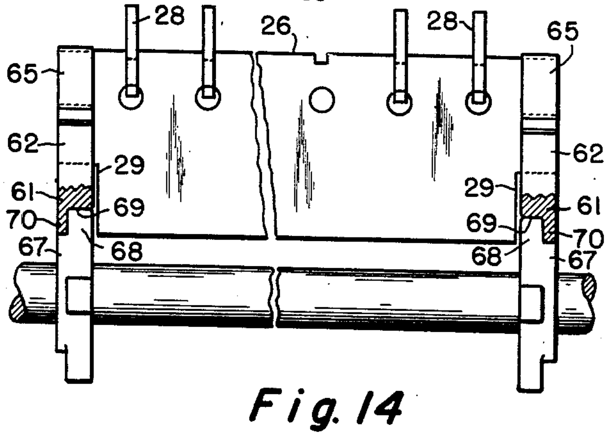
Figure 14 is a side fragmentary view showing the mounting of a circuit strip on the belt of Figure 12, but on an enlarged scale.

In Figures 12 to 14, inclusive, I have shown a further modification of the movable support for the circuit strips. In this modification, the movable support comprises two endless flexible belts 61 of solid flexible material. This material may be one of a variety of rubbers or plastics, but I have found that polyethylene is particularly suitable. Each of the two plastic belts has, at spaced intervals along its length, projections 62 extending outwardly from one side of the belt, as shown in Figure 12. The circuit strips used on these flexible belts are the same as the circuit strips 26 used in the switch shown in Figures 1 to 9, inclusive, and the ends of these strips are inserted in slots 63 cut inwardly from the outer end of the projections 62 of the belt. The edges of the projections 62 have lugs 64 at a point approximately one-third the length of the projections in from their ends and extending outwardly and towards the belt. U-shaped metal spring clips 65 extend across the ends of the projections 62 and over the outer end of the strips 26 when they are inserted in the slots 63. The legs of the U-shaped clips 65 have inwardly turned hooks 66 adjacent their ends which engage the lugs 64 and thereby hold the clips 65 on the ends of the projections 62 and the clips in turn hold the circuit strips 26 in the slots 63 of the projections 62.

Each of the belts 61 passes over sprocket wheels 67 which are mounted on shafts in the same manner as the sprocket wheels 42 are mounted on the shafts 40 and 41 in the switch shown in Figures 1 to 4, inclusive. The sprocket wheels 67 have teeth 68 which mesh with pockets 69 formed in the belt 61 opposite to each projection 62. Referring to Figure 14, it will be seen that each of the belts 61 has a flange 70 forming one side of the pockets 69. This flange serves to position the belts on the sprocket wheels 67 and prevent sidewise movement of the belts and the strips which they carry.

Figure 15:
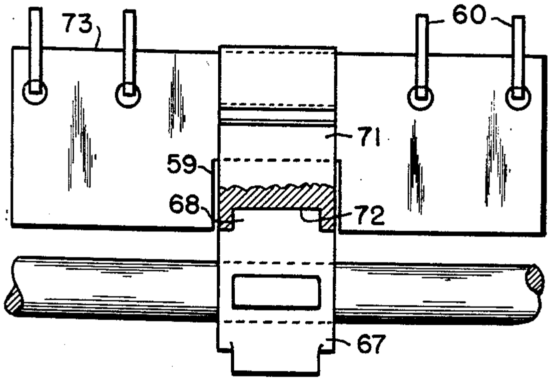
Figure 15 is a view similar to Figure 14 showing a modified form of support for the circuit strips.

Figure 15 shows a further modification of the movable support for the circuit strips. In this modification, the support comprises a single flexible belt 71 which is the same in construction as the belts 61 shown in Figures 12 to 14, but which is widened so as to provide an adequate grip on circuit strips 73. It also has pockets 72 for engaging lugs 68 of the sprocket wheel 67, which are in the center of the belt instead of at one side as in the case of the belts 61. The circuit strips 73 used with this form of movable support are the same in construction as the circuit strips 56 shown in Figure 11.

From the foregoing description, it is apparent that my multiple position switch solves the problems and overcomes the disadvantages inherent in multiple position switches of the wafer and turret types which have heretofore been used. There is ample room on both sides of each circuit strip for components and circuits, and printed circuits can be used on both sides of the strip. The components on active circuit strips are spaced further from components on inactive circuit strips than has been possible on prior multiple position switches. By reason of this increased spacing between active and inactive circuit strips, the shielding requirement is minimized so far as capacitors and resistors are concerned.

My inventions also minimize the shielding requirement so far as inductances are concerned. Referring to Figure 4 of the drawings, it will be noted that the circuit strip having contacts in engagement with the fixed contacts lies in a plane forming an angle of 90° with the circuit strips which are next to it on the movable support. The axes of the active and inactive components on the strips are likewise at 90° to each other and the possibility of inductive coupling is thereby minimized. This angle of 90° between active and inactive components can always be maintained by coordinating the spacing of the strips along the flexible movable support and the radius of curvature of the path of movement of the strips adjacent to the fixed contacts. The strips may be arranged so that the axes of the active and inactive components are at angles with each other which differ from 90°, but the angle of 90° is most effective in reducing coupling.

In my switch, components carried by the circuit strips can be adjusted without placing an adjusting tool through the main circuitry. This is illustrated in Figures 1 and 4. Referring to Figure 1, the sides 19 and 20 have holes 74 through which a tool may be inserted to engage adjustment screws 75 carried by one or more of the components on the strip. In Figure 4, I have shown in chain lines the blade 76 of a screwdriver inserted through one of the holes 74 and engaging an adjustment screw carried by a component on a circuit strip which is connected to the fixed contacts 25. As is apparent from Figure 4, such adjustment can be made to components on either or both sides of a circuit strip.

Circuit strips can readily be removed and replaced in my switch. All that is required is to remove one of the sides 19 or 20 which, as appears from Figure 2, are held onto the ends of the casing only by a frictional grip between the ends 16 and 17 and the flanges 19*a* and 19*b* or 20*a* and 20*b*. The circuit strips can be removed from the belt shown in Figures 1 to 4 simply by drifting the pins 36 and pulling the strips out of the slots 34 in the legs 30. In the case of switches using the movable supports for the strips which are shown in Figures 12 to 15, inclusive, it is only necessary to remove the spring clips 65 from the projections 62 and pull the strips out of the slots 63.

Referring to Figures 1 to 3, it will be seen that my switch has a generally rectangular shape which provides an efficient space factor. That is, the space required for installation of the switch is proportional to the actual size of the switch. Moreover, additional switch positions can be provided without a disproportionate increase in the over-all size of the switch and without a rather complete retooling of switch parts. This is not true of known multiple position switches which are of generally cylindrical shape. All that is required to increase the number of positions in my switch, other than the additional strips required, is to lengthen the flexible belts which carry the circuit strips and increase the length of the sides and ends of the casing. These changes occur in one plane only, whereas in a cylindrically-shaped switch the changes occur in many planes and a rather complete redesign and retooling of switch parts is required.

Of particular importance is the fact that my circuit strips lie in planes extending at an angle (preferably at right angles) to their path of movement. This feature minimizes the possibility of coupling of active and inactive components, as explained above, and it makes component adjustments more convenient. Also, it permits the mounting of contacts on one or both edges of the circuit strips, thereby increasing the number of contacts which can be installed on a strip and also permitting the mounting of components on both sides of the strips and the use of printed circuits on both sides of the strip.

While I have described certain presently preferred embodiments of my invention, it is to be understood that it may be otherwise embodied within the scope of the appended claims.

I claim:

1. A multiple position switch comprising a plurality of fixedly positioned switch contacts, a plurality of circuit carriers having electronic circuit modifying components and contacts thereon, which contacts are adapted to engage at least some of said fixed contacts, a support for the carriers whereby the carriers are movable in straight and curved paths of travel, means for moving the carriers in a curved path towards and away from the fixed contacts whereby the contacts on the carriers will engage the fixed contacts, one carrier at a time, the curvature of said curved path and the spacing of the carriers from each other when in said curved path being such that a carrier having contacts engaging the fixed contacts lies in a plane forming an angle with the planes in which the two carriers lie which are nearest on the support to said carrier whereby components on said carrier connected to the fixed contacts and the components on the other two carriers are in substantially noninterfering electrical relationship with each other.

2. A multiple position switch comprising a plurality of fixedly positioned switch contacts, a plurality of circuit carriers having electronic circuit modifying components and contacts thereon, which contacts are adapted to engage at least some of said fixed contacts, a support for the carriers whereby the carriers are movable in straight and curved paths of travel, means for moving the carriers in a curved path towards and away from the fixed contacts whereby the contacts on the carriers will engage the fixed contacts, one carrier at a time, the curvature of said curved path and the spacing of the carriers from each other when in said curved path being such that components on a carrier having contacts engaging the fixed contacts lie in a plane forming an angle of substantially 90° with the planes in which components lie on the two carriers which are nearest on the support to the carrier having contacts engaging the fixed contacts.

3. A multiple position switch comprising a plurality of fixedly positioned switch contacts, a plurality of circuit carriers having electronic circuit modifying components and contacts thereon, which contacts are adapted to engage at least some of said fixed contacts, a flexible support for the carriers, the carriers being spaced at intervals along the support, means for moving and guiding the support to bring the contacts on the carriers into engagement with the fixed contacts, one carrier at a time, and to lead the support in a curved path as the carriers move toward and away from the fixed contacts, the curvature of said curved path and the spacing of the carriers along the support being such that components on a carrier having contacts engaging the fixed contacts lie in a plane forming an angle with the planes in which components lie on the two carriers which are nearest on the support to the carrier having contacts engaging the fixed contacts whereby components on said carrier connected to the fixed contacts and the components on the other two carriers are in substantially noninterfering electrical relationship with each other.

4. A multiple position switch comprising a plurality of fixedly positioned switch contacts, a plurality of circuit carriers having electronic circuit modifying components and contacts thereon, which contacts are adapted to engage at least some of said fixed contacts, a flexible support for the carriers, the carriers being spaced at intervals along the support, means for moving and guiding the support to bring the contacts on the carriers into engagement with the fixed contacts, one carrier at a time, and to lead the support in a curved path as the carriers move toward and away from the fixed contacts, the curvature of said curved path and the spacing of the carriers along the support being such that components on a carrier having contacts engaging the fixed contacts lie in a plane forming an angle of substantially 90° with the planes in which components lie on the two carriers which are nearest on the support to the carrier having contacts engaging the fixed contacts.

5. A multiple position switch comprising a plurality of fixedly positioned switch contacts, a plurality of circuit carriers having electronic circuit modifying components and contacts thereon, which contacts are adapted to engage at least some of said fixed contacts, a flexible support for the carriers, the carriers being spaced at intervals along the support, means for moving and guiding the support in straight and curved paths of travel to bring the contacts on the carriers into engagement with the fixed contacts, one carrier at a time, the curvature of at least one of said curved paths and the spacing of the carriers along the support being such that components on a carrier having contacts engaging the fixed contacts lie in a plane forming an angle with the planes in which components lie on the two carriers which are nearest on the support to the carrier having contacts engaging the fixed contacts whereby components on said carrier connected to the fixed contacts and the components on the other carriers are in substantially noninterfering electrical relationship with each other.

6. A multiple position switch comprising a plurality of fixedly positioned switch contacts, a plurality of circuit carriers having electronic circuit modifying components and contacts thereon, which contacts are adapted to engage at least some of said fixed contacts, a flexible support for the carriers, the carriers being spaced at intervals along the support, means for moving and guiding the support in straight and curved paths of travel to bring the contacts on the carriers into engagement with the fixed contacts, one carrier at a time, the curvature of at least one of said curved paths and the spacing of the carriers along the support being such that components on a carrier having contacts engaging the fixed contacts lie in a plane forming an angle of substantially 90° with the planes in which components lie on the two carriers which are nearest on the support to the carrier having contacts engaging the fixed contacts.

7. A multiple position switch as described in claim 3, in which the flexible support for the carriers comprises at least one strip of flexible material, and means for securing the carriers to said strip at spaced intervals along its surface.

8. A multiple position switch as described in claim 3, in which the flexible support for the carriers comprises at least one link belt, and means for securing the carriers to links of said belt.

9. A multiple position switch as described in claim 3, in which the flexible support for the carriers comprises belt links pivotally secured to the carriers, and spacing the carriers from each other, said belt links and said carriers forming a link belt.

10. A multiple position switch comprising a generally rectangular casing, a plurality of contacts fixedly mounted in the casing, a flexible support, circuit carriers spaced at intervals along the support and carrying contacts extending outwardly from at least one of their edges, two shafts rotatably mounted in the casing and carrying the support whereby rotation of the shafts moves the support, at least one of said shafts being mounted adjacent the fixed contacts so that as the support moves around the shaft it brings the carriers one at a time into a position where the contacts on the carrier engage the fixed contacts, said carriers having electronic circuit modifying components thereon, the spacing of the carriers along the support and the curvature of the support adjacent the fixed contacts being such that components on a carrier with contacts engaging the fixed contacts lie in a plane forming an angle with the planes in which components on the carriers lie which are next to it on the flexible support, said angle being such that there is substantially noninterfering electrical relationship between the components connected to the fixed contacts and the components on the other carriers.

11. A multiple position switch comprising a generally rectangular casing, a plurality of contacts fixedly mounted in the casing, a flexible support, circuit carriers spaced at intervals along the support and carrying contacts extending outwardly from at least one of their edges, two shafts rotatably mounted in the casing and carrying the support whereby rotation of the shafts moves the support, at least one of said shafts being mounted adjacent the fixed contacts so that as the support moves around the shaft it brings the carriers one at a time into a position where the contacts on the carrier engage the fixed contacts, said carriers having electronic circuit modifying components thereon, the spacing of the carriers along the support and the curvature of the support adjacent the fixed contacts being such that components on a carrier with contacts engaging the fixed contacts lie in a plane forming an angle of substantially 90° with the planes in which components on the carriers lie which are next to it on the belt.

References Cited in the file of this patent

UNITED STATES PATENTS

| | | |
|---|---|---|
| 1,200,894 | Sibley | Oct. 10, 1916 |
| 1,591,917 | Wilde | July 6, 1926 |
| 1,684,394 | Haase | Sept. 18, 1928 |
| 1,717,370 | Coleman | June 18, 1929 |
| 1,763,233 | Gebhard | June 10, 1930 |
| 1,867,820 | Gebhard | July 19, 1932 |
| 1,965,590 | Gebhard | July 10, 1934 |
| 2,594,111 | Albrecht | Apr. 22, 1952 |